(12) United States Patent
Taheri et al.

(10) Patent No.: US 12,117,701 B2
(45) Date of Patent: Oct. 15, 2024

(54) GRADUATED ELECTRO-OPTIC DEVICE AND METHOD

(71) Applicant: ALPHAMICRON INCORPORATED, Kent, OH (US)

(72) Inventors: Bahman Taheri, Shaker Heights, OH (US); Pedro Coutino Soto, Kent, OH (US)

(73) Assignee: APLPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 18/022,539

(22) PCT Filed: Aug. 31, 2021

(86) PCT No.: PCT/US2021/048418
§ 371 (c)(1),
(2) Date: Feb. 22, 2023

(87) PCT Pub. No.: WO2022/047371
PCT Pub. Date: Mar. 3, 2022

(65) Prior Publication Data
US 2023/0314883 A1    Oct. 5, 2023

Related U.S. Application Data

(60) Provisional application No. 63/072,361, filed on Aug. 31, 2020.

(51) Int. Cl.
*G02F 1/1347* (2006.01)
*G02F 1/133* (2006.01)
(Continued)

(52) U.S. Cl.
CPC ...... *G02F 1/13471* (2013.01); *G02F 1/13306* (2013.01); *G02F 1/1337* (2013.01); *G02F 1/13439* (2013.01)

(58) Field of Classification Search
None
See application file for complete search history.

(56) References Cited

U.S. PATENT DOCUMENTS 3,741,629 A * 6/1973 Kahn ................ G02F 1/134309
349/193
4,896,945 A * 1/1990 Ooba ................ G02F 1/134309
349/110
(Continued)

FOREIGN PATENT DOCUMENTS

JP    H11352445 A    12/1999

OTHER PUBLICATIONS

International Search Report and Written Opinion received for International Application No. PCT/US2021/048418, mailed on Nov. 29, 2021, 7 Pages.
(Continued)

*Primary Examiner* — Ryan Crockett

(57) ABSTRACT

An optical device with one or more spatially variable optical response characteristics is disclosed. The optical device includes a cell including a liquid crystal material contained between a pair of substrates, each substrate having a transparent conductive layer provided thereon. An electrode connection contacts each transparent conductive layer. A driving signal source is in electrical communication with each electrode connection for application of a driving signal to the cell. An applied driving signal to the electrode connections from the driving signal source creates a voltage gradient in a gradient direction along the pair of transparent conductive layers leading away from the electrode connections. The voltage gradient is received by the liquid crystal material to produce a gradient in at least one optical response characteristic across at least a portion of the device.

22 Claims, 17 Drawing Sheets

(51) Int. Cl.
*G02F 1/1337* (2006.01)
*G02F 1/1343* (2006.01)

(56) References Cited

U.S. PATENT DOCUMENTS

| | | | |
|---|---|---|---|
| 5,250,937 A * | 10/1993 | Kikuo | G09G 3/3607 |
| | | | 345/94 |
| 6,999,220 B2 | 2/2006 | Kosa et al. | |
| 7,009,757 B2 | 3/2006 | Nishioka et al. | |
| 7,102,602 B2 | 9/2006 | Kim et al. | |
| 7,567,306 B2 | 7/2009 | Park et al. | |
| 7,811,482 B2 | 10/2010 | Miller et al. | |
| 8,016,415 B2 | 9/2011 | Figler et al. | |
| 8,194,228 B2 | 6/2012 | Sato et al. | |
| 8,562,130 B2 | 10/2013 | Kosa et al. | |
| 8,736,805 B2 | 5/2014 | Borenstein et al. | |
| 8,906,088 B2 | 12/2014 | Pugh et al. | |
| 9,034,457 B2 | 5/2015 | Su et al. | |
| 9,102,652 B2 | 8/2015 | Sukhomlinova et al. | |
| 9,116,370 B2 | 8/2015 | Taheri et al. | |
| 9,130,097 B2 | 9/2015 | Taheri et al. | |
| 9,134,551 B2 | 9/2015 | Sukhomlinova et al. | |
| 9,200,203 B2 | 12/2015 | Sukhomlinova et al. | |
| 9,303,209 B2 | 4/2016 | Munoz et al. | |
| 9,304,333 B2 | 4/2016 | Taheri | |
| 9,335,565 B2 | 5/2016 | Miller, IV et al. | |
| 9,513,524 B2 | 12/2016 | Soto et al. | |
| 9,829,720 B2 | 11/2017 | De Smet et al. | |
| 9,869,887 B2 | 1/2018 | Taheri et al. | |
| 9,918,508 B2 | 3/2018 | Ryan et al. | |
| 10,095,052 B2 | 10/2018 | Bhatta et al. | |
| 10,310,349 B2 | 6/2019 | Taheri et al. | |
| 10,330,970 B2 | 6/2019 | Komanduri et al. | |
| 10,401,690 B2 | 9/2019 | Baker et al. | |
| 10,600,978 B2 * | 3/2020 | Toko | H10K 71/621 |
| 10,914,991 B2 | 2/2021 | Miller, IV et al. | |
| 11,194,208 B2 | 12/2021 | Soto et al. | |
| 11,435,610 B2 | 9/2022 | Miller, IV et al. | |
| 11,500,255 B2 | 11/2022 | Taheri et al. | |
| 2004/0179148 A1 | 9/2004 | Nishioka et al. | |
| 2006/0164593 A1 | 7/2006 | Peyghambarian et al. | |
| 2006/0250338 A1 * | 11/2006 | Karman | G02F 1/13439 |
| | | | 345/87 |
| 2007/0139333 A1 | 6/2007 | Sato et al. | |
| 2008/0246900 A1 | 10/2008 | Taheri et al. | |
| 2014/0028924 A1 * | 1/2014 | Yamaguchi | G03B 17/565 |
| | | | 349/1 |
| 2016/0026026 A1 | 1/2016 | Kim et al. | |
| 2017/0357141 A1 | 12/2017 | De Smet et al. | |
| 2018/0031947 A1 * | 2/2018 | Shibuya | G02F 1/13 |
| 2020/0201112 A1 | 6/2020 | De Smet et al. | |
| 2023/0408873 A1 * | 12/2023 | Kimura | G02F 1/13439 |

OTHER PUBLICATIONS

De Roose, et al. "An active artificial iris controlled by a 25 uW flexible thin-film driver" 2016 IEEE International Electron Device Meeting (IEDM), San Francisco, USA, 2016, pp. 32.1.1-32.1.4.

Algorri, et al., "Recent Advances in Adaptive Liquid Crystal Lenses", Crystals 2019, 9, 272, May 2019, pp. 20.

* cited by examiner

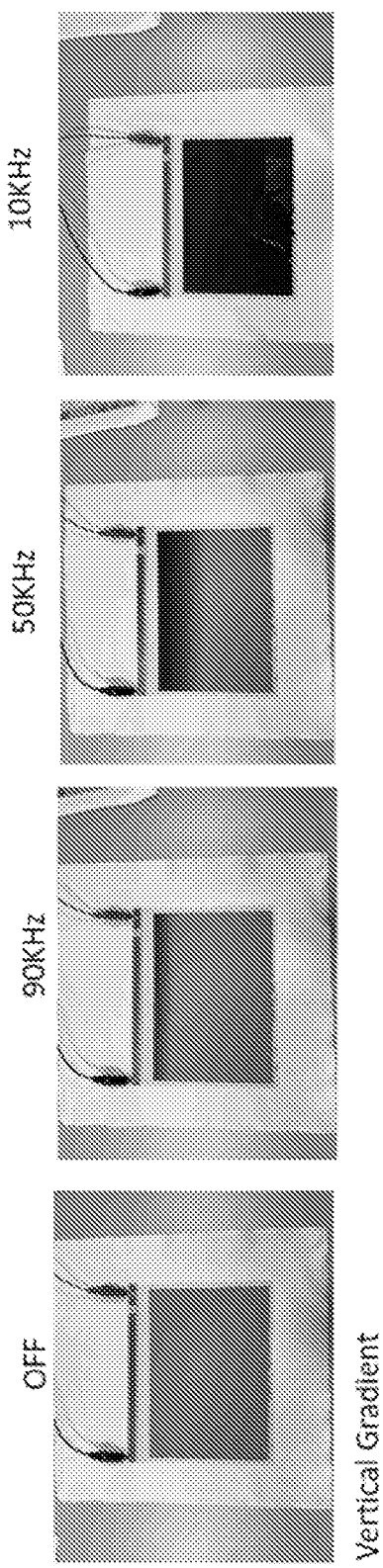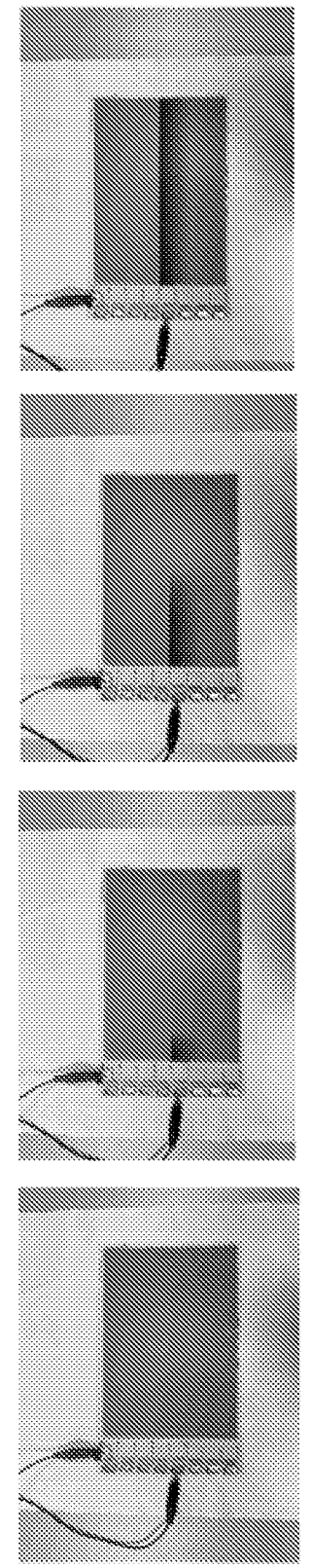

GRADUATED ELECTRO-OPTIC DEVICE AND METHOD

CROSS-REFERENCE TO RELATED APPLICATIONS

This application is a $371 application of International Patent Application Number PCT/US2021/048418 filed Aug. 31, 2021, entitled "GRADUATED ELECTRO-OPTIC DEVICE AND METHOD" which claims priority to, and any other benefit of, U.S. Provisional Patent Application Ser. No. 63/072,361, entitled GRADUATED ELECTRO-OPTIC DEVICE AND METHOD, filed Aug. 31, 2020, each of which is fully incorporated herein by reference.

TECHNICAL FIELD

The present invention relates to optical devices.

BACKGROUND ART

Conventional optical devices such as eyewear, lenses, camera filters, and glazings typically have fixed optical properties such as tint, reflection, or focal length. This results in a compromised user experience by having a sub-optimal performance in certain applications. In some everyday examples the quality and versatility of the optical device is not so demanding. In other settings, for instance during movie shooting where professional and optimal lighting is required, a camera's optical properties are critical. Therefore, in these applications, a common method is to change the optical device depending on the environmental conditions. This poses a great constraint in the versatility of an optical device. Furthermore, there are many instances in which it is not possible to physically change the optical device. To overcome this, graded devices are used. These are optical devices wherein the optical performance varies depending on the position used. Common examples of these include graded tint in sunglasses, multifocal prescription lenses, sun grading in the car windshield, and graded camera filters. For example, during a movie shoot where the natural sunlight saturates the brightness of the picture, a filter with a graduated tint is used with the tint being darkest at the "top" where the most sunlight enters the camera lens (FIG. 1A). Because these filters are not on-demand adjustable, they have to be changed when the sunlight conditions change. As such, even for these systems, there is a need for multiple filters with "wider" or "narrower" (spatially variable) tint region for different lighting conditions.

To overcome the challenges with conventional optical devices, adaptable optical devices that can adjust their optical responses according to the surrounding environment's conditions and/or the user's needs is desired. In this case, the tint of an optical device, for example, can be altered depending on the ambient lighting conditions. Alternatively, the focal length (adjustable refractive index) of a lens can be adjustable. This has been demonstrated using electro-optic materials such as liquid crystals (LCs). For example, an electrical signal is supplied to a transparent conductor such as ITO. This alters the optical properties of the electro-optic material and hence the device. To achieve a "gradient" pixelation or some other electrode patterning has been needed. In this case, the electrical signal is applied to specific pixels similar to that used in conventional LCDs. Therefore, to make a device with a spatially "graduated" change in optical properties requires multiple regions each having a different optical property. This, in turn, means complex pixelation of the transparent conductor, multiple electrode contacts, and sophisticated drivers. Even under these conditions, only a "step-wise" change is achieved. This approach is not suitable for certain applications, e.g., for photography or filming. The "stepwise" filter creates an optical interface between two adjacent regions which results in parasitic changes in refraction or intensity of the incident light. This change is often recorded by the camera sensor and is typically considered undesirable. To illustrate this, FIG. 1A shows a prior art example of a smoothly gradual fixed tint camera filter, where the tint transition is gradual but fixed. FIG. 1B shows a prior art LC variable tint device with various pixels or segments having different tint. This device can achieve different tint levels, but the tint transition is stepwise and abrupt. FIG. 1C shows a plot illustrating the relationship between the "step-wise" light transmittance T % and the distance D along the side of the filter (Y-axis).

Another type of a graduated tint device is an artificial iris. One example is an intraocular lens that includes a number of individually addressable concentric LCD rings, See FIG. 2 (from Smet, Herbert De et al. "Curved Guest-Host LCD used as a dynamic artificial iris." (2014) Society for Information Display, Mid-Europe Chapter, Spring Meeting 2014; abstract book. p. 22-22). These rings can be turned on or off and the darkness of each ring or zone can be electrically controlled. In the figure, only the extreme states are shown (maximum transmission and maximum absorption). The on/off switch of these LCD rings creates an iris-like feature, which can be used to help people with iris deficiencies such as aniridia or leiomyoma. One drawback of this type of multi-ring iris is that one can only adjust the tinted area in a stepwise fashion but cannot create a continuous gradient tinted area that simulates a natural iris.

Transmittance/absorbance of light is one type of optical response that can be adjusted. There are other optical responses that can be achieved through control of the refractive index of the device. A common example of this is a lens. The focal length of an optical device is typically determined by three different factors: the curvature of the optical device (either concave or convex), the thickness of the lens, and the refractive index of the material. Because all three are physical properties of the lens itself, the focal length of a single lens is non-adjustable once the lens is manufactured. To have adjustable focusing depth, a set of lenses with different focal length is often needed. Or alternatively, a complex movement of fixed focal length lenses are used to adjust the image location or depth of focus. These bulky approaches are not viable in, for example, a bi- or tri-focal eyewear, or in a camera lens that requires a variable focal length. To eliminate the requirement of multiple lenses and create a single lens system that has an adjustable focal length feature, devices that can produce adjustable refractive index have been attempted and proposed. Liquid crystals are suitable electro-optic material for this type of application due to their high birefringence and low power consumptions. (e.g., US Pub. No. 2004/0179148A1, U.S. Pat. Nos. 7,009,757; and 10,330,970). Existing examples using LC material to create variable refractive indices typically involve complex patterned electrodes and/or complex alignment layers in order to have different regions of the LC layer having different applied voltages. See e.g., FIG. 3 (adopted from US Pub. No 2006/164593A1 Adaptive Electro-Active Lens With Variable Focal Length). In addition to not achieving a gradual transition, these patterned methods require many complicated manufacturing steps.

In summary, the static, non-tunable, or stepwise optical properties (such as tint and optical length) of conventional optical devices limit their use under various situations and there is a need for a better optical device having tunable, spatially adjustable optical properties that eliminates the stepwise transition and simplifies manufacture. The inventions described herein set out to address some of the issues discussed above.

SUMMARY OF THE INVENTION

Described herein is an optical device with spatially variable optical response characteristics.

The optical device includes a cell including a liquid crystal material contained between a pair of substrates, each substrate having a transparent conductive layer provided thereon. An electrode connection contacts each transparent conductive layer. A driving signal source is in electrical communication with each electrode connection for application of a driving signal to the cell. An applied driving signal to the electrode connections from the driving signal source creates a voltage gradient in a gradient direction along the pair of transparent conductive layers leading away from the electrode connections. The voltage gradient is received by the liquid crystal material to produce a gradient in at least one optical response characteristic across at least a portion of the device.

BRIEF DESCRIPTION OF THE DRAWINGS

For a complete understanding of the objects, techniques and structure of the invention, reference should be made to the following detailed description and accompanying drawings, wherein:

FIG. 16 is a top view of an example of an LC cell with various gradient tints in response to varying driving signals.

DETAILED DESCRIPTION OF THE INVENTION

Described herein are liquid crystal (LC) optical devices with variable optical response characteristics that can be altered along a gradient without using multiple electrode connections to multiple sections or pixilation. In the device of the invention, a variable voltage gradient is achieved along a direction using the capacitive and/or resistive properties of the LC cell's transparent conductive layer.

Figure 1C:
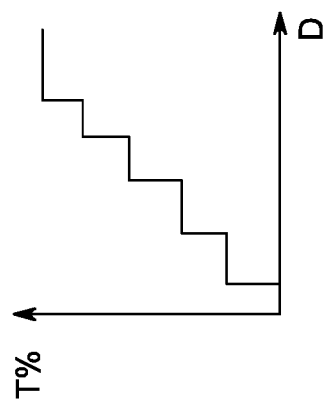
FIG. 1 (A) shows a prior art example of a static optical device with permanent, continuous tint fading gradually along direction D; (B) shows a variable optical device with segmented variable tine, (C) shows a graph of the relationship between transmittance rate T % and distance D.
Figure 1B:
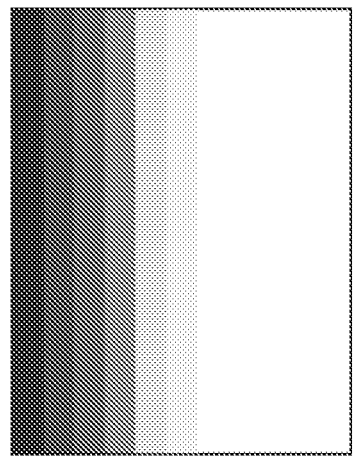
Figure 1A:
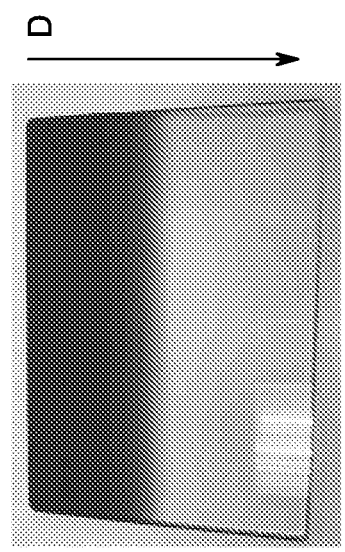
Figure 2:
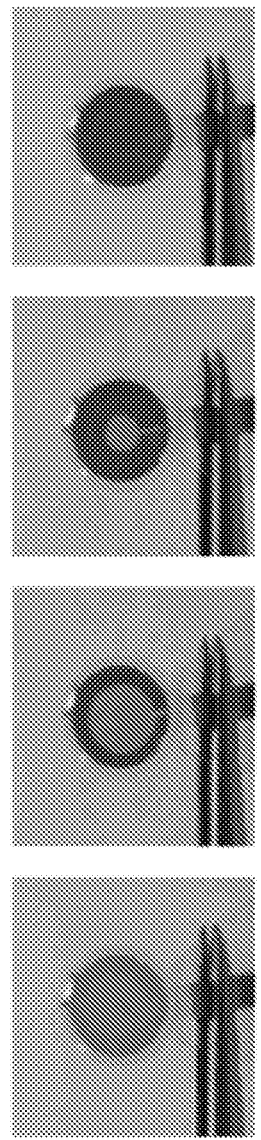
FIG. 2 shows a prior art example of a tunable iris (contact lens) with stepwise tint adjustability.
Figure 3:
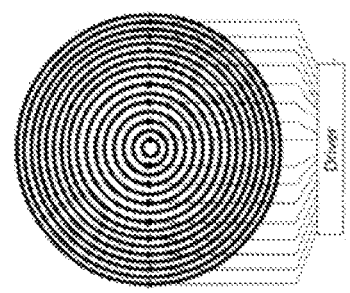
FIG. 3 shows a prior art example of a device with adjustable refractive indices with patterned electrodes.
Figure 4:
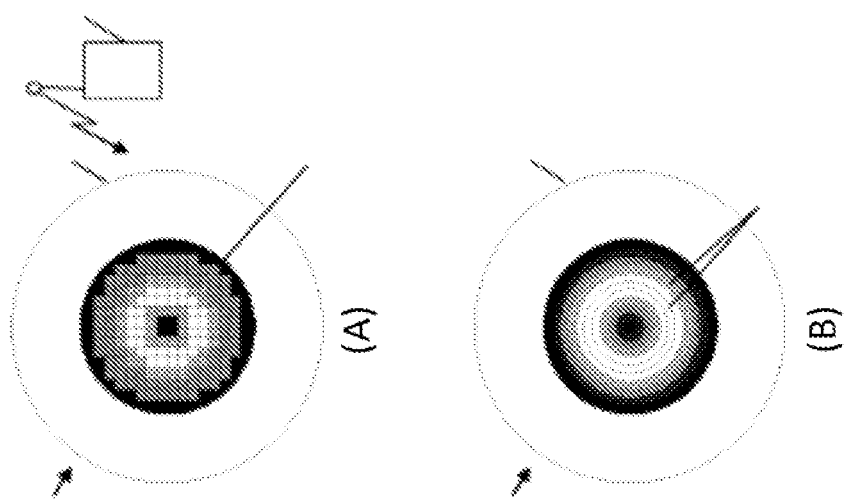
FIG. 4 shows a prior art example of an adjustable tint or iris contact lens changing through pixelation (A) or segmentation (B) in a stepwise tint change.

In general, in an LC cell, the LC molecule orientation is dependent on the voltage applied. In order to achieve regions with spatially variable optical properties in a device using the LC molecule orientation, it has been necessary to pixelate or segment the cell into various segments (or pixels) in each region, and apply a different voltage to each segment/pixel, so as to achieve a different LC molecule orientation and therefore a different optical effect in the corresponding region. (e.g. see FIGS. 4A and 4B, taken from De Smet U.S. Pat. No. 9,829,720, showing a plurality of segments each with its own voltage to create variable optical characteristics). Alternatively, it is necessary to control the physical construction of a device such as spatially changing the cell gap/physical properties of the liquid crystal such as d/p, or polymer content or by spatially varying the conductivity/resistivity of the transparent conductor layer. This type of approach is complex to manufacture and control. In addition, the variation between adjacent segments or pixels results in a "stepwise" variation that is not a smooth transition and can create unwanted optical aberrations such as diffraction, refraction and visible lines between the segments.

The inventors have discovered that the lossy capacitor nature of a liquid crystal cell, the low conductivity of a transparent conductor such as ITO (greater than or equal to 1 Ohm/square), and a sufficiently high frequency of the applied Driving Signal can be used to create a voltage gradient within a cell and reduce or eliminate the need for pixelation/segmentation or other approaches stated above. By proper choice of material, device configuration and driving waveform applied to an LC cell, a spatial gradient in the voltage experienced by the LC can be established which in turn can alter the optical property along a dimension of an LC cell. The driving signal is applied across an electrode connection at a location or region to obtain a voltage gradient away from the region, which in turn achieves a gradient effect in the optical properties of the cell stemming from the connection region. The depth of the gradient is determined and controlled by appropriate control in the applied Driving Signal, conductivity of the transparent conductors, and the configuration of the LC used. This approach reduces or eliminates the need for multiple segments, each needing its own electrode connection and voltage, to achieve a gradient effect in a cell, improves the optical performance of the device and simplifies its manufacture.

Definitions

"Driving Signal" refers to an electric signal that is applied to an LC cell and has various characteristics including voltage (amplitude, polarity), frequency, duration and waveform.

"Electrode Connection" refers to the point or area where the driving signal is applied to a conductive layer of the cell. In some examples, the electrode connection is a bus, but it may take any shape or form, as known in the art.

"Optical Response Gradient Direction" refers to a direction which starts with a first end (typically near the electrode connections) and finishes with a second end (typically away from the electrode connections). The first end typically has the most significant optical response of the entire gradient, and the second end typically has the least significant optical response of the entire gradient.

"Optical Response Characteristic" refers to light reflection, refraction, absorption, scattering, or any combination thereof. The light that is reflected, refracted, absorbed, or scattered may include visible light, UV light, or IR light.

"Voltage Gradient" means a continuous, spatial increase or decrease of an applied voltage along a certain direction, for example, along the optical response gradient direction. In some examples, "continuous" means not pixelated.

"Absorption band" may define the spectral wavelength wherein absorption occurs.

"Clear state" or "clear state transmission", as used herein, may refer to the state where a guest-host mixture exhibits maximal light transmittance.

"Dark state" or "dark state transmission" may refer to the state where a guest-host mixture exhibits minimal light transmittance.

"Dichroic (DC) Dye" is an organic molecule that has a rodlike shape and displays a unique anisotropy in which its light absorption properties occur parallel ($\alpha_{\parallel}$) and perpendicular ($\alpha_{\perp}$) to the molecule, this being characterized by the dichroic ratio, $DR=\alpha_{\parallel}/\alpha_{\perp}$. Any molecule that has a dichroic ratio (DR) is one that exhibits "dichroism".

"Dichroic ratio", "average dichroic ratio" or $D_{mix}$ of the mixture ($DR=\alpha\perp/\alpha\parallel$) refers to the dichroic ratio of the guest-host mixture which may contain one or more DC dyes. The mixture dichroic ratio may be measured using the formula for Effective Dichroic Ratio ($D_{eff}$) or Aggregate Effective Dichroic Ratio ($D_{eff\text{-}agg}$). Thus, as used herein, $D_{mix}$, $D_{eff}$ or $D_{eff\text{-}agg}$ are used interchangeably (depending on which method is used to measure the dichroic ratio) and describe the same parameter.

"Narrow Band Absorption" as used herein, is defined as a spectral absorption band width with a Full Width at Half Max (FWHM) that is less than or equal to 175 nm, or alternatively less than or equal to 165 nm, 155 nm, 120 nm, or 80 nm, where the entire spectral absorption band is measured within the visible region of 400-700 nm.

"Visible light" refers to a wavelength range of about 400 to about 700 nm.

"Wide band absorption" as used herein, may refer to a spectral absorption band that is greater than 175 nm, and preferably greater than 180 nm, 185 nm, 190 nm, 195 nm or 200 nm, where the entire spectral absorption band is contained within the range of visible wavelengths, typically assumed to be 400 nm-700 nm "Wide Band Device" refers to a device capable of producing a wide absorption band, and a wide (i.e. >30%) transmission swing with polarization sensitivity of less than 50%, or in some examples less than 40%, 30%, 20%, 15%, or in some examples less than 10%.

Description

In embodiments of devices described herein, the gradient optical response of the optical device is achieved by applying a driving signal to the LC cell and using the impedance properties of the device. Upon the application of the driving signal, and depending on the characteristics of the LC cell, one can achieve one or a combination of gradient optical responses. A driving signal is an electric signal that is applied to the LC cell electrodes that has various characteristics including voltage (amplitude, polarity), frequency, duration, and waveform (sine wave, square wave, triangle wave, sawtooth wave, alternating polarity, non-alternating polarity, or the like). Each of these characteristics may influence the LC's molecular movement and orientation, which in turn results in a change of the LC cell's optical response.

The LC material are responsive to the applied external voltage/electric field. When a voltage is applied to the LC cell, the nematic LC molecules reorient and align either with or perpendicular to the electric field. The statistically averaged orientation of the elongated molecules points in a particular direction and a unit vector along this direction is called the "director." The LC molecules are homeotropically aligned when the director is perpendicular to the substrates; and the LC molecules are in the planar orientation when the director is parallel to the substrates. When the entire cell has a uniform voltage, the cell exhibits a uniform optical response. When different regions of the cell have different voltages, the cell exhibits a varied optical response. When the LC cell has a gradient variable voltage along a certain direction, it creates a gradient variable optical response characteristic along such direction, i.e., a spatially variable optical response characteristic.

The above-described optical responses of the LC molecules with regard to the change of the applied voltages are used to make adjustable optical devices having a gradient optical property. Some non-limiting example embodiments are described in detail herein, with reference to the accompanying drawings, but it should be noted that other examples and embodiments are possible within the spirit and as defined by the claims.

Figure 5:
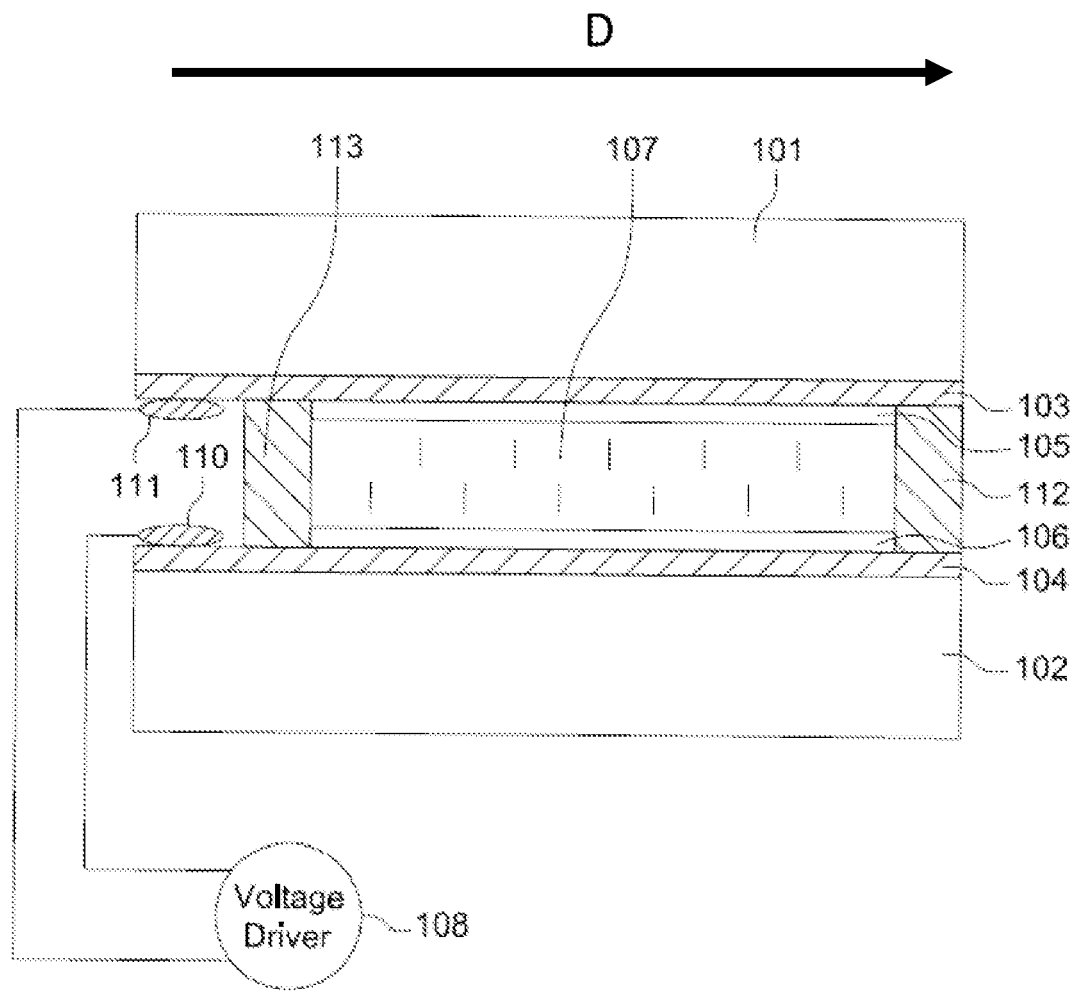
FIG. 5 is a schematic cross-sectional view of a liquid crystal cell according to some embodiments.

The inventors first look into light transmittance/absorbance as the optical response for the optical device. That is, where the optical response characteristic is light absorption. Light absorbance results in a tint in the LC cell. To make the tint gradual, continuous (not pixelated) and tunable, the first embodiment adopts an LC cell, for which the tint can be changed by varying the driving signal that dictates the orientation of the liquid crystal molecules within the LC cell. FIG. 5 is a cross-sectional representation of a liquid crystal device according to some embodiments that includes a light-varying liquid crystal cell 100 connected to a driving signal source 108, e.g., a voltage driver.

The cell 100 includes a liquid crystal material or mixture 107 interposed between a pair of opposed substrates 101, 102. As discussed in more detail later, the substrates may be independently selected and include, for example, a polymeric material, a glass, or a ceramic. In some embodiments, the LC mixture may be polymer-free or in certain embodiments, it is possible to use polymeric LC. Transparent conductive layers 103, 104 are disposed on an inner surface of each substrate 101, 102, respectively. Alignment layers 105, 106 may be provided on an inner surface of conductive layers 103, 104, respectively (i.e., adjacent the LC material 107). Alignment layers 105 and 106 may be provided to assist controlling the orientation of liquid crystal materials disposed between the substrates. As a non-limiting example, the alignment layer may include polyimide. In some embodiments, the alignment layer may be rubbed as is known in the art to assist in orienting the LC material or mixture near the surface. In some embodiments, both alignment layers of a cell are rubbed. In some embodiments, a cell may include only one alignment layer or only one rubbed alignment layer. In some embodiments (not shown), a passivation layer may optionally be provided over a transparent conductive layer. The passivation layer may include, for example, a non-conductive oxide, sol-gel, polymer, or a composite. In some cases, the passivation layer may be provided between the transparent conductive layer and the alignment layer. In some cases, an alignment layer may act as a passivation layer The voltage driver 108 connects to each conductive layer 103 and 104, through an electrode connection, 110 and 111, and is configured to apply a driving signal across the cell. The driving signal may be selected to establish a voltage gradient along the transparent conductive layers in a gradient direction D extending away from the electrode connections. Electrode connections 110, 111 may collectively be referred to as an electrode connection set. The cell 100 further includes a border seal 112 and 113, which contains the liquid crystal material inside the cell. The thickness of the LC material disposed between the substrates may be referred to as the cell gap. To maintain a particular gap, optional spacers (not shown) such as glass or plastic beads or rods may be inserted between the substrates.

In some embodiments, the cell may use a guest-host LC-dye mixture (i.e., a mixture of a cholesteric liquid crystal host and a dyestuff material) to impart a spatially variable absorption/tint in response to the orientation of the LC host and dye molecules. However, it is understood that many other LC compositions/configurations can be used to achieve the desired optical property or effect, some of which may not use a dyestuff material. Some non-limiting examples of useful materials and components are described below.

LC Material or Host

In some embodiments, the LC material or host may have a positive or negative dielectric anisotropy and may include a nematic, smectic, cholesteric, twisted, STN or other LC material. In some embodiments, the LC material includes a chiral nematic or cholesteric liquid crystal material (collectively "CLC") which may have a negative dielectric anisotropy ("negative CLC") or a positive dielectric anisotropy ("positive CLC"). In some embodiments of the CLC, the liquid crystal material is cholesteric, or it includes a nematic liquid crystal in combination with a chiral dopant. A CLC material has a twisted or helical structure. The periodicity of the twist is referred to as its "pitch". The orientation or order of an LC material may be changed upon application of an electric field, and in combination with a dyestuff material, may be used to control or partially control the optical properties of the cell. In some embodiments, an LC material may be further characterized by its chirality, i.e., right-handed chirality or left-handed chirality.

A wide variety of LC materials are available and have potential utility in various embodiments of the present disclosure.

Dyestuff Material

In some embodiments where the optical gradient involves light absorption, the LC mixture may include a dyestuff material. The dyestuff material generally includes at least one dichroic (DC) dye or mixture of DC dyes. In some cases, the dyestuff material may optionally further include photochromic-dichroic (PCDC) dye whose light absorbance may be activated by exposure to UV light such as sunlight. In some embodiments, the dyestuff material may further include a small amount of a conventional absorbing dye, e.g., to provide the device with a desired overall hue in a clear state. In some embodiments, the dyestuff material includes substantially only DC dyes. The dyestuff material may provide a narrow band absorption or a broadband absorption. The tint imparted to the LC cell may have a color or may be a neutral hue.

DC Dyes

Dichroic dyes typically have an elongated molecular shape and exhibit anisotropic absorption. Commonly, the absorption is higher along the long axis of the molecule and such dyes may be referred to as "positive dyes" or dyes exhibiting positive dichroism. Positive DC dyes are generally used herein. However, in some cases, negative DC dyes that exhibit negative dichroism may be used instead. In some embodiments, a DC dye (as measured in a CLC host) may have a dichroic ratio of at least 5.0, alternatively at least 6, 7, 8, 9, 10, 11, 12, 13, 14, 15, 16, 17, 18, 19 or 20.

The level of visible light absorption by the DC dye may be a function of the dye type and the LC host. The orientation or long-range order of the LC may be a function of electric field or voltage across the cell thickness. A DC dye exhibits some alignment with the LC host (e.g., a CLC host) so that application of a voltage may be used to alter the apparent darkness of the cell.

In some embodiments, a DC dye may include a small molecule type of material. In some embodiments, a DC dye may include an oligomeric or polymeric material. The chemical moiety responsible for light absorption may, for example, be a pendent group on a main chain. Multiple DC dyes may optionally be used, for example, to tune the light absorption envelope or to improve overall cell performance with respect to lifetime or some other property. DC dyes may include functional groups that may improve solubility or miscibility with the LC host. Some non-limiting examples of DC dyes may include azo dyes, for example, azo dyes having 2 to 10 azo groups, or alternatively, 2 to 6 azo groups. Other DC dyes are known in the art, such as anthraquinone and perylene dyes. Generally, any molecule with dichroic properties can be used.

Other Cell Features

Substrate

The substrate may be independently selected and may include a plastic, a glass, a ceramic, or some other material. Choice of material and its particular properties depends in part on the intended application. For many applications, the support should be at least partially transmissive to visible light. In some embodiments a support may have higher than 45% transmission to visible radiation having a wavelength between 400 nm and 700 nm, alternatively, higher than 40%, 50%, 60%, 70%, 80%, 90%, or 95% transmission. In some embodiments, the support may have high optical clarity so that a person or sensor may clearly see through the LC cell. In some embodiments, the support may optionally have some color or tint. In some embodiments, the support may have an optical coating on the outside of the cell. A support may be flexible or rigid.

As some non-limiting examples, a plastic support may include a polycarbonate (PC), a polycarbonate and copolymer blend, a polyethersulfone (PES), a polyethylene terephthalate (PET), cellulose triacetate (TAC), a polyamide, p-nitrophenylbutyrate (PNB), a polyetheretherketone (PEEK), a polyethylenenapthalate (PEN), a polyetherimide (PEI), polyarylate (PAR), a polyvinyl acetate, a cyclic olefin polymer (COP) or other similar plastics known in the art. Flexible glass include materials such as Corning® Willow® Glass and the like. A support may include multiple materials or have a multi-layer structure.

In some embodiments, the thickness of a support may be in a range of 10-20 µm, 20-30 µm, 30-40 µm, 40-50 µm, 50-75 µm, 75-100 µm, 100-150 µm, 150-200 µm, 200-250 µm, 250-300 µm, 300-350 µm, 350-400 µm, 400-450 µm, 450-500 µm, 500-600 µm, 600-800 µm, 800-1000 µm, or greater than 1 mm or any combination of ranges thereof.

Transparent Conducting Layer

By "transparent" conducting layer, it is meant that the conducting layer allows at least 45% of incident visible light to pass through. A transparent conducting layer may absorb or reflect a portion of visible light and still be useful. In some embodiments, the transparent conducting layer may include a transparent conducting oxide (TCO) including, but not limited to, ITO or AZO. In some embodiments, the transparent conducting layer may include a conductive polymer including, but not limited to, PEDOT:PSS, a poly(pyrrole), a polyaniline, a polyphenylene, or a poly(acetylene). In some embodiments, the transparent conducting layer may include a partially transparent thin layer of metal or metal nanowires, e.g., formed of silver, copper, aluminum, or gold. In some embodiments, the transparent conducting layer may include graphene.

In some embodiments, electrode connections 110, 111 and/or the wiring between the voltage driver and the transparent conductive layers may be formed of electrically conductive materials having higher electrical conductivity than the transparent conductive layers. Electrode connections may include a metal, an alloy, conductive carbon, graphene, or conductive metal oxide. In some cases, electrode connections are not required to be optically transparent.

In some embodiments, electrode connections 110 and 111 may be located in proximity to each other, i.e., located at about the same position within the device. In cross-section, for example, one electrode connection (e.g., 111) may appear in approximate alignment over another electrode connection (e.g., 110). The electrode connections may be co-located at or near a device edge (as shown in FIG. 5), or alternatively at or near a device corner, or at or near a device center. In some cases, the transparent electrode may be characterized by a maximum linear dimension (length, diagonal, diameter, or the like) and the lateral distance between the two polarity of electrode connections (if any) may be within about 20% of the maximum linear dimension, alternatively, within 15%, 10%, 5%, or 2%.

In some cases, electrode connections 110, 111 may act as a bus bar and extend along one edge of the transparent conductive layer (e.g., in direction orthogonal relative to the page of FIG. 5). In some embodiments, electrode connections 110, 111 may be a small spot (point connection) or have some other shape or size, depending on the device. In some embodiments, electrode connection 110, 111 may each represent a series of individual point- or spot-connections.

Figure 6:
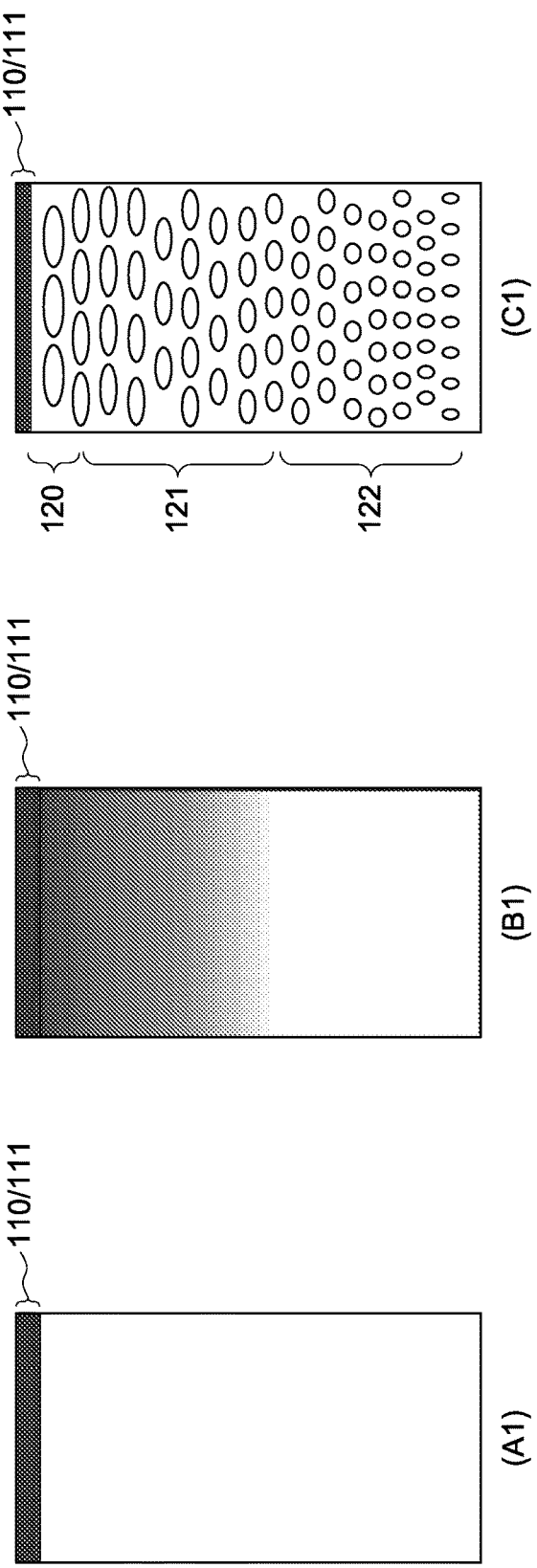
FIG. 6 (A1) shows a liquid crystal cell (LC cell) according to some embodiments without an applied driving signal; (B1) with a driving signal applied; (C1) the molecular rotation of the liquid crystal molecules; (A2), (B2) show the corresponding plot of transmission T % against distance D; (C2) shows the relationship between the director orientation θ and the applied voltage.
Figure 6:
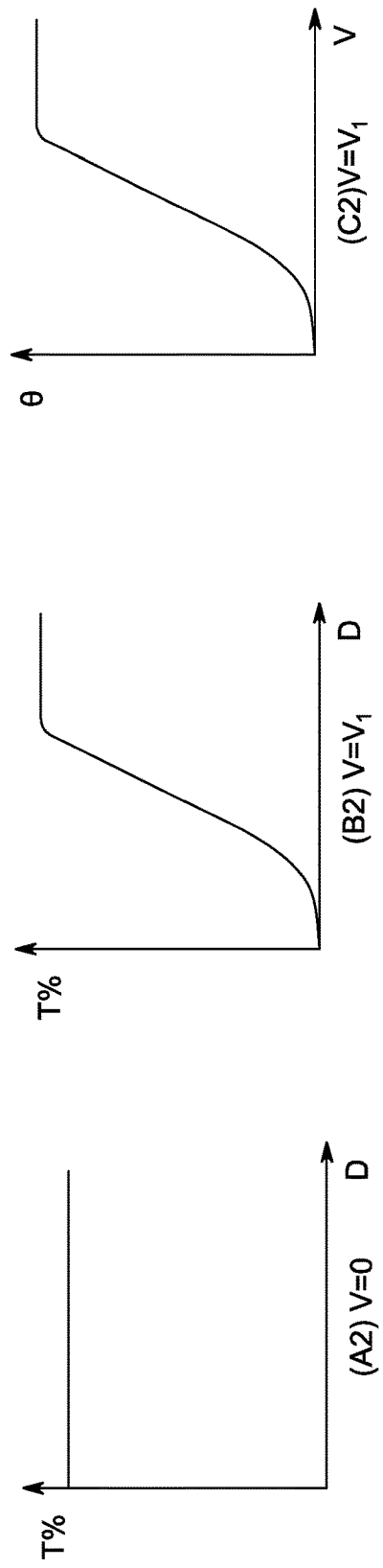

FIGS. 6(A1) and (B1) are the frontal view of one non-limiting example of an LC cell where it has maximal transparency in an OFF state (A1), and a gradient tint along the Y-axis (D direction in the figure) in an ON state (B1). In this example, electrode connection 110/111 is an electrode bus and applies voltage to one edge of the cell. When no voltage is applied, there is no driving signal sent to the conductive layers 103 and 104 (not presented in the figure); the liquid crystal material or mixture 107 is transparent and has maximum light transmittance. In this example, the cell contains a negative anisotropy LC, so when V=1 or V=max, the LC molecules assume a homogeneous or planar orientation (illustrated as region 120 in (C1)). When V=0, the liquid crystal molecules have a homeotropic orientation (illustrated as region 122 in (C1)); and when V is between V=0 and V=max, the LC molecules assume various orientations between the planar orientation and the homeotropic orientation (illustrated as region 121).

When a driving signal is applied from electrode connection 110/111 to the cell 100, the liquid crystal molecules re-orientate in response to the voltage. The driving signal can be applied such that it sets up a voltage gradient along D, where D is the distance between a given spot on the substrate and the electrode connection 110/111. The area nearest electrode connection 110/111 has the strongest driving signal (V-Max), resulting in the device exhibiting maximum light absorption (for that voltage). Thus, this part of the cell exhibits the darkest tint of the entire gradient. See FIG. 6(B1) for illustration. The voltage applied across the LC mixture between the two transparent conductive layers attenuates as it penetrates along D, which in turn results in the liquid crystals gradually becoming homeotropic and absorbing less light as D increases. This results in the cell's tint gradually getting lighter as D increases, until the substrate reaches its maximum light transmittance. FIG. 6(C1) is a schematic drawing showing the relationship between the darkness of the tint and the molecular orientation of the liquid crystals for FIG. 6(B1). FIGS. 6(A2) and (B2) correspond to FIGS. 6(A1) and (B1) respectively and show the corresponding change in T % and the distance (D) along the voltage gradient. The relationship between the applied voltage V and the director orientation angle θ is illustrated in FIG. 6(C2).

In some embodiments (not shown here), the LC material may have a positive anisotropy. In such cases, the LC cell may be in a darkened or tinted state at V=0 and transform to a clear state upon application of an appropriate voltage. That is, in some case when using a positive anisotropy LC material, the gradient shading may be opposite of that shown in FIG. 6 (B1).

Figure 7:
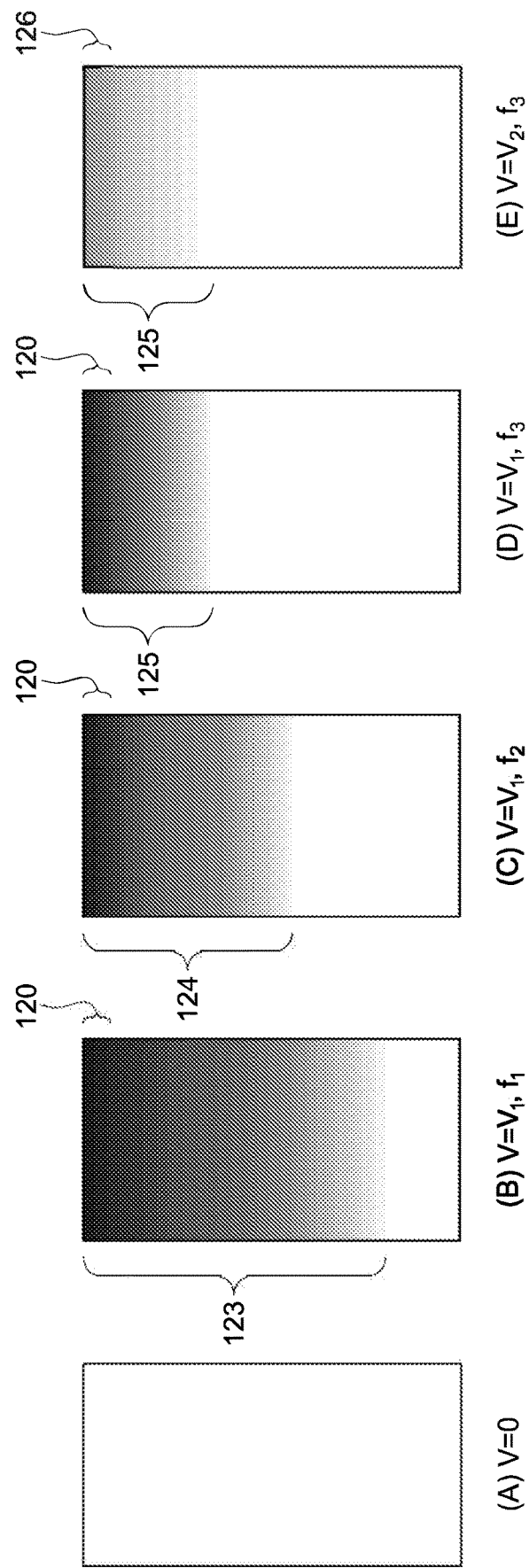
FIG. 7 shows the influence on the cell's tint when the driving signal varies its frequency and voltage according to some embodiments.

The total length and the level of darkness of the tint in the gradient can be adjusted by varying the driving signal. The electrode connections 110/111 are not exhibited in the figures, but it is understood that in this non-limiting example, the electrode connections are located at the top border of each cell if using a negative anisotropy LC. In the examples shown in FIG. 7, the driving signal controls two aspects of the cell's tint: the length of the tint, illustrated as regions 123, 124, 125; and the darkest tint of a gradient, illustrated as regions 120 and 126. The length of a cell's tint, for example 123, 124, 125, can be controlled by the applied frequency. A higher frequency results in a smaller region of tint, and a lower frequency results in a larger region of tint. In FIG. 7(B)-(D) for example, the applied frequency $f_1$ is lower than $f_2$ and is lower than $f_3$, which result in the longest tint length, 123, in (B), a shorter are 124 in (C); and the shortest area 125, in (D). The level of darkness (absorbance)

of the darkest tint of a gradient, i.e. the end closest to where the driving signal is applied to the cell, is controlled by the applied voltage, and a higher voltage results in a darker tint, cf. 120 in (D) and 126 in (E). In FIG. 8(D)-(E) for example, the applied frequency for both is $f_3$, but the applied voltage $V_1$ is higher than $V_2$. As a result, both (D) and (E) have the same length of tint, but the darker tint of the two gradients occurs as 120 in (D), which has a higher applied voltage than (E). It should be noted that by altering various aspects of the driving signal (e.g., frequency, voltage, waveform, position the voltage is applied) an LC device can be "tuned" to achieve the desirable variable gradient effect. It should also be noted that tint can refer to a color tint, or a neutral grey/brown tint, as desired.

Figure 8C:
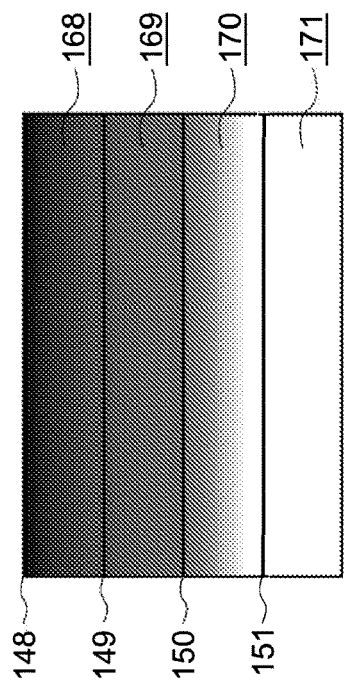
FIG. 8 shows some possible combinations of multiple LC cells put together according to some embodiments.
Figure 8B:
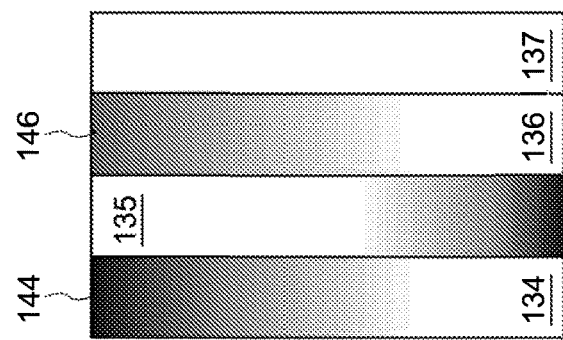
Figure 8A:
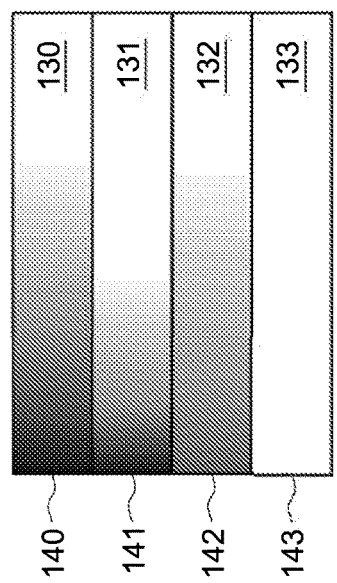

Because the length and the darkness/tint of the liquid crystal cell can be altered by changing the driving signal, one can combine multiple spatially variable cells together to achieve multiple spatially variable areas. In this type of device, each individual spatially variable cell may be supplied with its own driving signal (individually addressable). The resulting device having various combined spatially variable cells can show a variety of tint pattern combinations, depending on the orientation and location of each individual spatially variable cell, and the applied voltage and frequency within each driving signal. In FIG. 8A for example, there are four horizontally placed cells 130-133 adjacent to each other, the driving signals are applied to the substrates from the left side of the cell through electrode connection sets 140-143.

There are other possible placements of each individual cells. For example, in FIG. 8B, four individually addressable cells 134-137 are placed vertically, with each individual one showing a different length of tint. In this example, the driving signal can enter from different ends of the cell. For example, cell 135 has its electrode connection set 145 on the bottom of the cell, while the two cells 134 and 136 have their electrode connection sets 144, 146 on the top of the cell. Cell 137 is shown in a clear state and may have its electrode connection set at the top or bottom. Alternatively, in FIG. 8C, multiple, individually addressable cells are used to enhance the tint gradient to achieve various characteristics as needed (e.g., when one spatially variable cell cannot achieve the % change in tint desired, one can combine two or more spatially variable or switchable cells to achieve the desired effect). Additionally, FIG. 8C illustrates how four horizontally placed spatially variable cells 168-171 together forms a continuous tint gradient. In this example, the electrode connection sets 148-151 are on the longer border (showing as the horizontal border in this figure) of each cell. In particular, electrode connection set 148 is part of LC cell 168, electrode connection set 149 is part of LC cell 169, electrode connection set 150 is part of LC cell 170, and electrode connection set 151 is part of LC cell 171. The gradient direction for each cell in FIG. 8C is in the downward vertical direction for each cell. The lighter end of cell 168 (distal from its electrode connection set) may have about the same tint as the darker end of cell 169 (adjacent its electrode connection set), and similarly, the lighter end of cell 139 may have about the same tint as the darker end of cell 140. Within each cell there may be a tint gradient and the cells are combined in a side-by-side fashion to achieve a more dramatic (bigger range) tint change.

Figure 9:
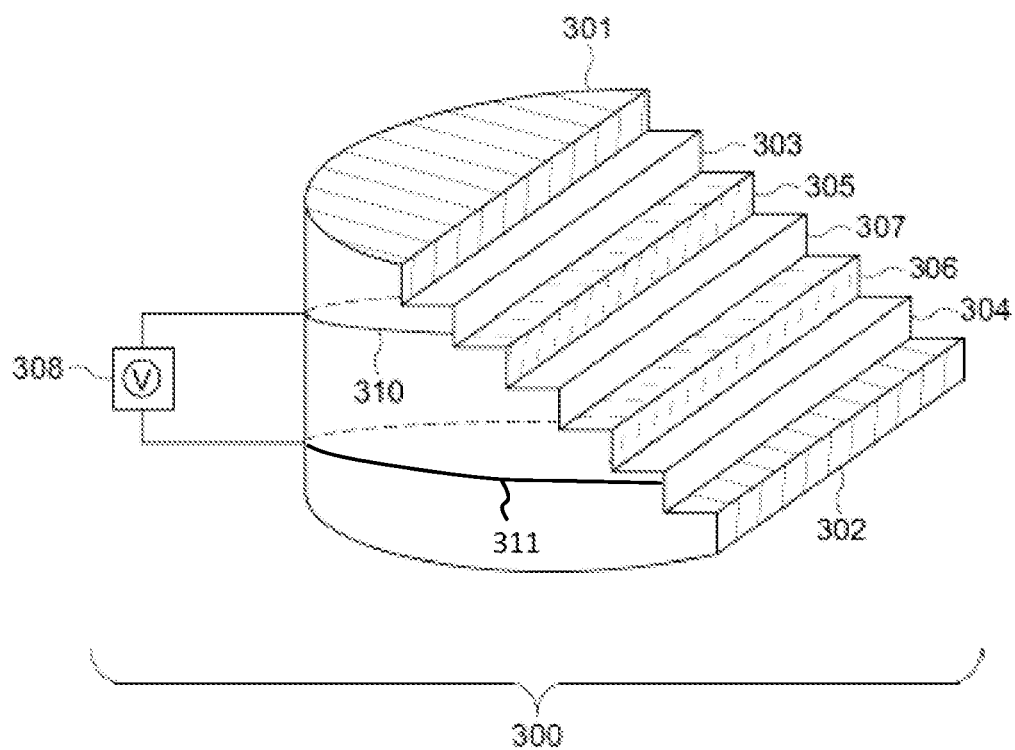
FIG. 9 shows stepped cutaway view of a circular LC cell and its layers within the cell according to some embodiments.

The substrates and each layer of the cells may have shapes other than the illustrated rectangular shape. FIG. 9 is a stepped cutaway schematic of a circular-shaped cell. Similar to cell 100, this circular cell 300 includes a liquid crystal material or mixture 307 interposed between a pair of opposed substrates 301, 302. Transparent conductive or electrode layers 303, 304 are disposed on an inner surface of each substrate 301, 302, respectively. Alignment layers 305, 306 may be provided on an inner surface of conductive layers 303, 304, respectively. The driving signal source 308 connects to each conductive layer 303 and 304, through an electrode connection, 310 and 311, respectively. The possible material compositions of each layer follow that of cell 100.

Figure 10A:
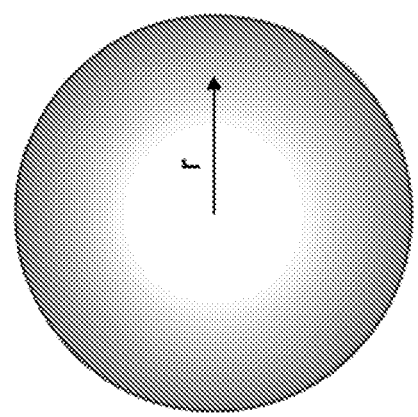
FIG. 10 (A) shows a radial gradient tint fading centrically according to some embodiments; (B) the plot of T % against radius r; (C) voltage V against r.
Figure 10B:
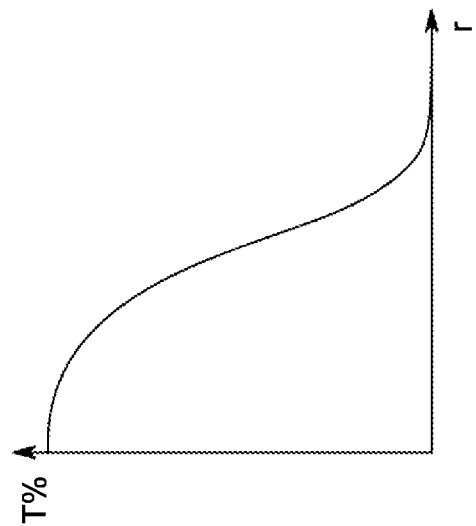
Figure 10C:
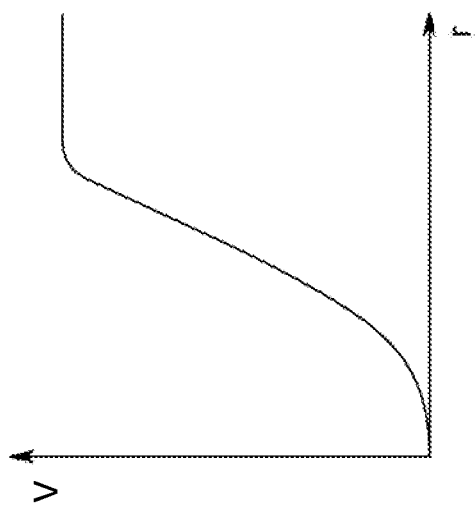

In some embodiments, the circular cell 300 has circular electrode connections 310 and 311, which surround the outer boundary (perimeter) of the circular conductive layers 303 and 304. Under this circular configuration, the driving signal is strongest at the perimeter, and it attenuates as it travels towards the center of the circular cell. For LC guest-host mixtures using a negative anisotropy LC material, this will result in radial gradient tint, with the perimeter of the circular cell having the darkest tint (highest light absorption) and the center of the circular cell having the lightest tint (lowest light absorption). See FIG. 10(A) for illustration of the radial tint exhibited by the cell. FIG. 10(B) illustrates the relationship between T % and r, in which r is the radius of the circle. FIG. 10(C) illustrates the relationship between r and voltage V.

Figure 11:
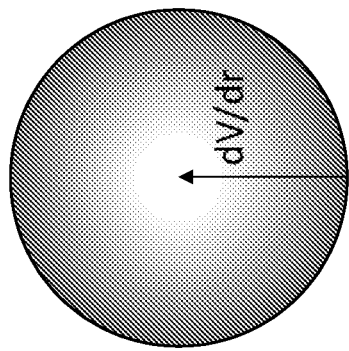
FIG. 11 shows the influence on the circular cell's tint when the driving signal varies its frequency and voltage according to some embodiments.
Figure 11:
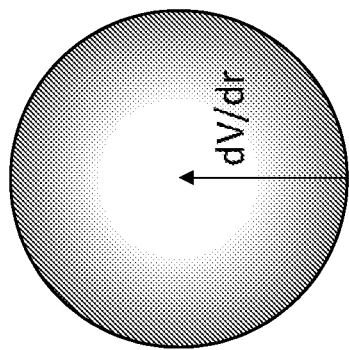
Figure 11:
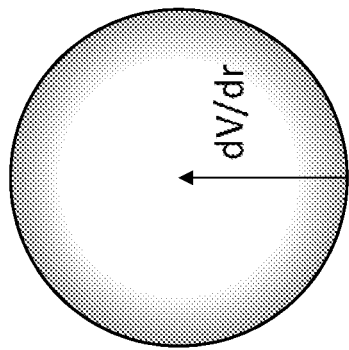

Similarly, the radial tint of the circular cell 300 can be tuned by adjusting the driving signal applied to the cell. For example, in FIG. 11, all three examples (A)-(C) have the same applied voltage $V_1$, but with different frequencies, $f_1$, $f_2$ and $f_3$. Different voltages or applied frequencies result in a different overall coverage area, and/or a different tint level. In FIG. 11, for example, $f_1$ is higher than $f_2$ and is higher than $f_3$. This controllable radially gradient tint resembles that of an iris, or a camera shutter, and the amount of light transmission through the optical device is controlled by the driving signal.

It is also possible to achieve this iris effect by placing the electrode connection in the center or close to the center of the circular cell and using different LC-dye configurations. For example, one configuration is one that is dark or tinted when no voltage is applied and becomes clear upon application of a voltage. In this case, the center of the iris having the highest voltage has maximal transparency, which gradually becomes tinted as the voltage level drops towards the edge or periphery.

The radial gradient tint's direction may also be reversed, for example, where the center of the circular shaped LC cell could have the darkest tint and the tint gradually fades out as the direction travels from the center of the circular shape to the peripheral boarder. Such "reversed" tint direction may be achieved by, for example, using a different type of LC material (e.g., a positive anisotropy LC material), where the LC guest-host mixture has maximum light absorbance ability when no voltage is applied and becomes transparent when voltage is applied. Such "reversed" tint direction can also be achieved by placing the electrode connection at the center part of each transparent electrode layer instead of in the periphery of the cell. Thus, under this circumstance, the center part of the LC cell has the highest voltage, correspondingly the LC material exhibits the strongest optical response, and gradually decreases along the gradient direction. One should also notice that such "reversed" gradient direction approaches also apply to other shapes of LC cells. For example, a rectangular shaped LC cell, in the "reversed" gradient setting, may have the least light absorbance in the area closest to the electrode connection, and the tint gradually getting darker as the signal travels along the gradient direction.

Also contemplated herein are various shapes (e.g. ellipse, triangle, rectangle, etc.) where the same principles can be applied.

The aforementioned embodiments focus on one of the optical responses, i.e. the change in the liquid crystal cell's light absorbance but other optical responses can also be varied in the same manner. For example, some embodiments can achieve a tunable refractive (or adaptive focus) ability of the optical device instead of, or in addition to, a spatially variable gradient tint in the previous embodiment.

An adaptive-focus lens is a device capable of tuning its focal length by means of the application of an external stimulus. Conventional lenses rely on two physical parameters to modify the impinging wavefront: (a) the difference between the refractive index of the lens material and the surrounding environment and (b) the curvature of their interfaces. (Algorri, J. F., Zografopoulos, D. C., Urruchi, V. & Sanchez-Pena, J. M. Recent Advances in Adaptive Liquid Crystal Lenses. Crystals 9(5), 272 (2019)).

The formula for the relationship is:

$$\Delta(\text{Optical path length}) = \Delta(n\ell)$$

where n=index of refraction and $\ell$ is the length (or thickness)

In a typical lens, n is constant and $\ell$ changes.

Figure 12:
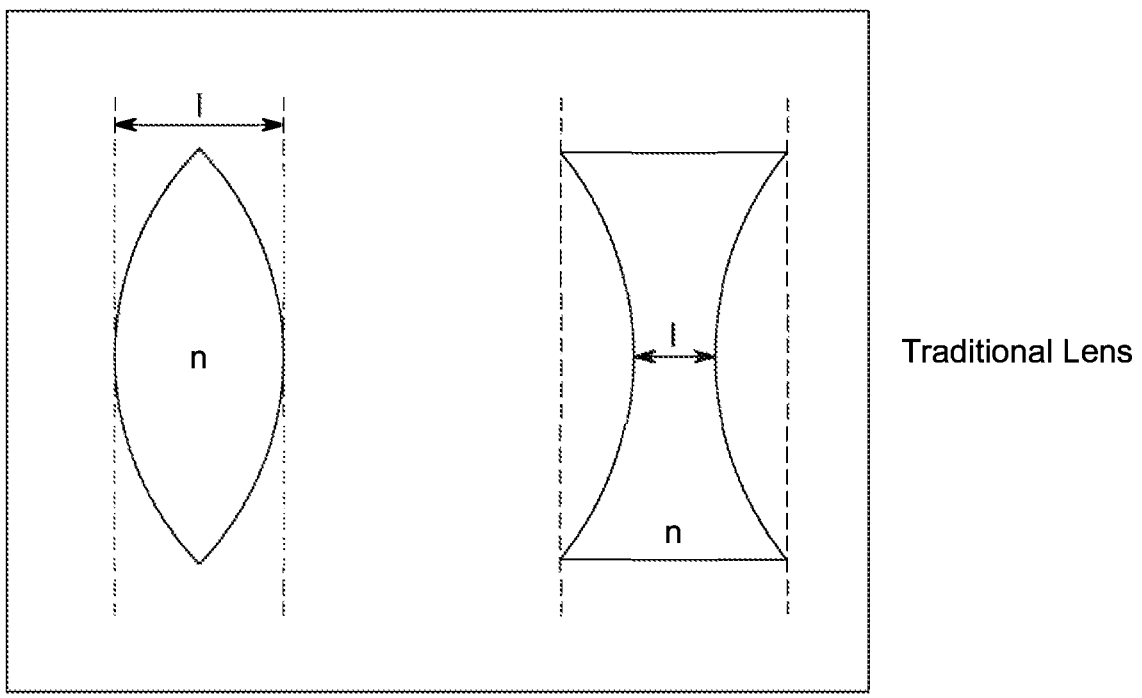
FIG. 12 is a schematic drawing of (A) a traditional double convex lens and (B) a traditional double concave lens.

FIG. 12 shows the schematic drawing of both (A) a double convex lens and (B) a double concave lens. Take the double convex lens for example, the type of material that the lens is made from determines the n. In each case, a lensing is observed because the optical path length varies radially. According to the equation above, one way to vary the optical path length when n stay constant is to radially change the thickness of the lens as done in conventional lenses. Alternatively, the thickness of the lens can remain constant, and radial change in n be imposed to change the optical path lens. Such change in n can be achieved in a LC optical device by changing the LC molecular orientation.

Adaptive-focus lenses are based on devices that change either the refractive index of the lens material or the curvature of its interface. Several techniques for the development of adaptive-focus lenses have been proposed, including refractive-index-controlled LC lenses.

Adaptive-focus lenses is based on the gradual variation of the refractive index. When light travels through a nonhomogeneous medium, the speed of the wavefront decreases in the optically dense regions and accelerates in areas of lower density. Based on this mechanism, lenses without curvature are made by using a material with a spatial gradient of its refractive index, such as for example, devices known as a GRIN (GRadex INdex) lens. In this respect, numerous approaches based on LC-lenses with an electrically controllable focal length have been demonstrated. Many of the topologies proposed for LC lenses are based on generating a gradual voltage across the lens capable of reproducing a parabolic refractive index gradient in the LC layer, thus mimicking the optical behavior of a conventional lens. Of particular interest are applications where a variable focal length is needed, which LC-lenses achieve with low driving voltages and low power consumption.

Figure 13A:
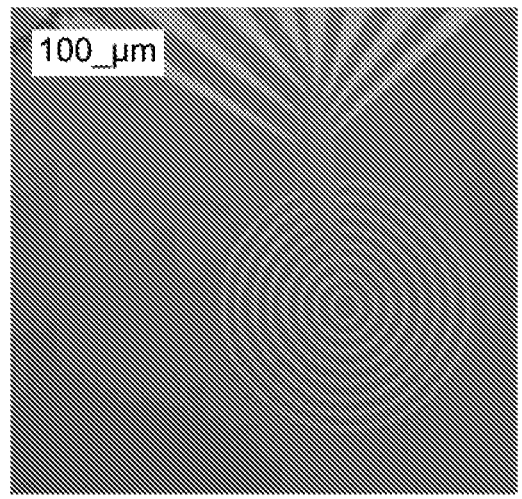
FIG. 13 shows an example of a prior art adaptive lens using patterned electrodes to adjust its refractive indices, which the multi electrode configuration results in each segment has a particular LC molecular orientation.
Figure 13B:
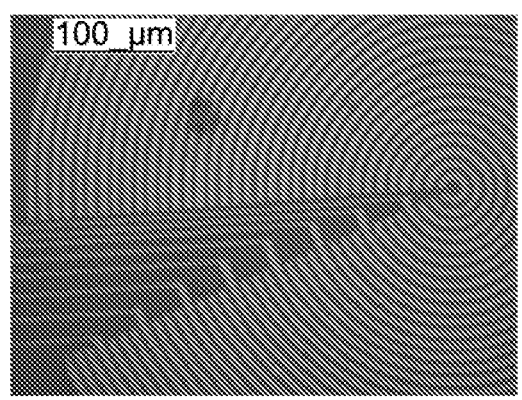
Figure 13C:
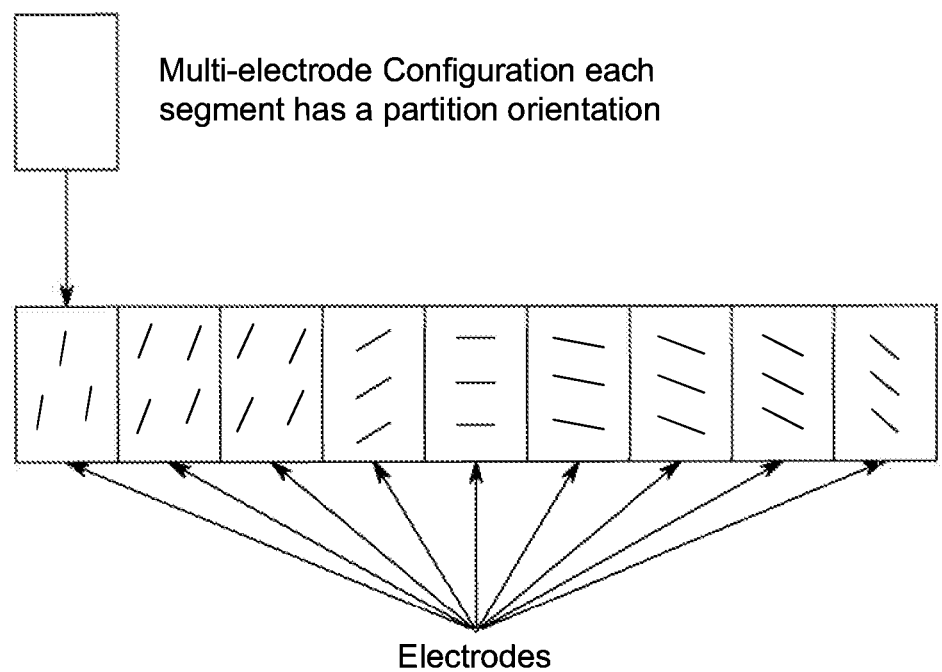

One approach to creating a refractive index gradient is to employ designs that have patterned indium tin oxide (ITO) in the structure to form a multielectrode configuration, each electrode requiring individual connectors and driving signals. See FIGS. 13A-C. However, this approach has a number of issues, including complexity of manufacturing and operation.

Figure 14A:
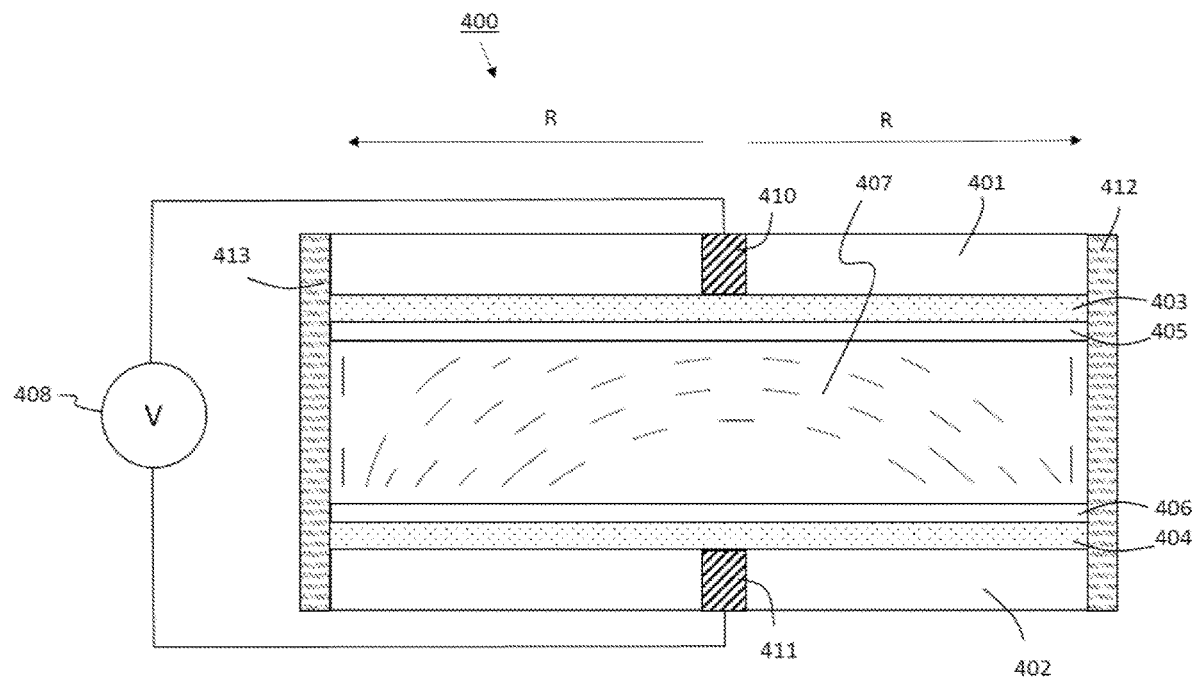
FIG. 14 shows the (A) gradual change in LC molecular orientation without using multiple electrodes, and (B) the relationship between refractive index n and the distance r between a position on the lens and the position of the electrode connection according to some embodiments.

Various embodiments described herein overcome some of these difficulties by removing the need for a patterned or multi-electrode configuration and instead using only one, or a reduced number of electrode connection sets. FIG. 14A is a cross-sectional schematic of a non-limiting example of a spatially variable refractive index device according to some embodiments. LC cell 400 may optionally be a circular device having a radius R. In some cases, LC cell 400 may operate as an optical lens. LC cell 400 includes a liquid crystal material or mixture 407 interposed between a pair of opposed substrates 401, 402. Transparent conductive layers 403, 404 are disposed on an inner surface of each substrate 401, 402, respectively. Alignment layers 405, 406 may be provided on an inner surface of conductive layers 403, 404, respectively (i.e., adjacent the LC material 407). LC cell 400 may further include border seal 412, 413. The driving signal source 408 connects to each conductive layer 403 and 404 through electrode connection 410 and 411, respectively. In some embodiments, electrode connections 410, 411 may be provided at or near the center of the device (as shown). In some cases, electrode connections 410, 411 may be electrically conductive vias that extend through the substrates. In other embodiments (not shown), the electrode connections may be provided at the perimeter of the transparent conductive layers or some other configuration, depending upon the desired operation of the device. The various components and materials of LC cell 400 may be as described above with respect to FIG. 5.

Figure 14B:
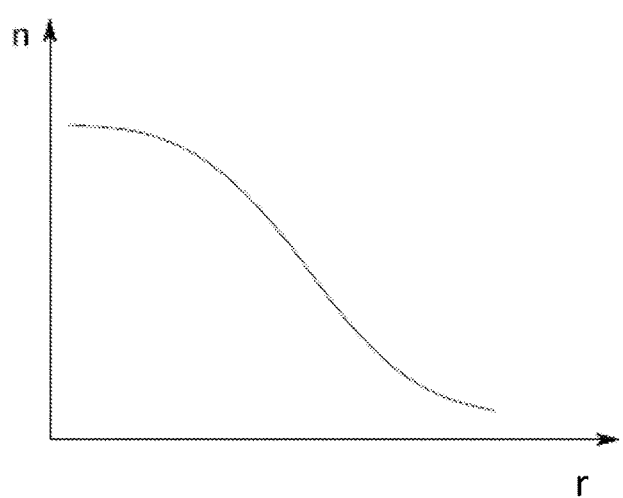

In some embodiments, when no voltage is applied to the LC cell, the LC material exhibits a refractive index of $n_c$ (c denotes center of a circular lens) as measured in a direction normal to the device (vertical direction in FIG. 14A). Upon the application of a driving signal, the LC molecules will start to rotate and depending on the strength of the voltage, exhibit a series of different director angles of rotation and consequently, different refractive indices (called $n_r$) along the direction R. Depending on the LC material's property, there may or may not be a threshold voltage ($V_{th}$). If there is such a threshold voltage, then even though there is an applied voltage, the LC director will not start to rotate until the applied voltage has surpassed the $V_{th}$. Similarly, there may be an upper limit of the applied voltage, $V_u$ where the LC director aligns parallel to the electric filed. Under this circumstance, even when increasing the applied voltage higher, the LC director no longer rotates. When the applied voltage is in between $V_{th}$ and $V_u$, the LC directors show different rotation angles. This feature of the LC molecules can be used to form a LC layer with varied refractive indices within the LC cell. See the graph in FIG. 14B which illustrates refractive index n as a function of distance, r, from the center.

For instance, when the driving signal forms a gradient voltage along a gradient direction R, and assume that the highest voltage of the gradient is above $V_u$, the region under this voltage will have the LC director parallel to the electric field. As the voltage gradually decreases along the gradient direction R, the LC director exhibits a continuously varied rotation angle, which results in continuously varied refractive indices along the gradient. The end point of the gradient may or may not be below $V_{th}$.

Other configurations are also contemplated here, including a lens where the electrode connection is in the periphery and the LC configuration is chosen to allow the desirable LC molecular orientation from the periphery towards the center. In addition, although the substrates of FIG. 14A are shown as flat, one or both may be curved. In some embodiments, the spatially variable refractive index device may be laminated over another optical device, e.g., a lens, to provide a variable focus lens.

Figure 15:
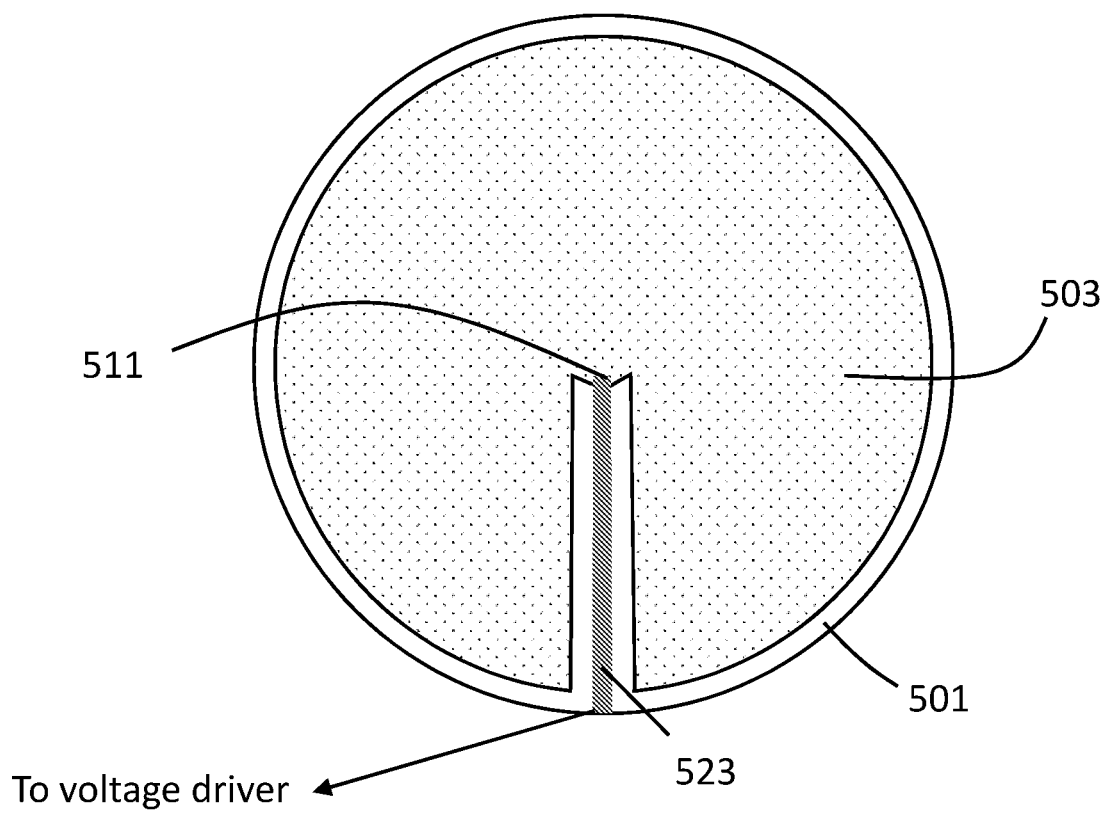
FIG. 15 is a top view of a non-limiting example of a transparent conductive layer and a narrow conductive line that have been patterned over a substrate according to some embodiments.

In some embodiments, rather than using a via connection, a connection to the center of a transparent conducting layer may be made using some limited patterning steps of the transparent conductive layer. For example, a top view of a substrate 501 and a patterned transparent conductive layer 503 is shown in FIG. 15. A narrow conductive line 523 (electrically from the transparent conductive layer on either side) may be provided extending from a substrate edge to the substrate center, in approximately the same plane as the transparent conducting layer. The point or area at or near the center where the narrow conductive line meets the main section of the transparent conductive layer may be referred to as the electrode connection 511. The narrow conductive line may be made of the same material as the transparent conducting layer or of some other electrically conductive material. In some embodiments the narrow conductive line of one substrate may extend in a different or an opposite direction relative to the narrow conductive line of the other substrate.

In some embodiments, a transparent conductive layer may have a pattern to assist in forming a desired voltage/optical response gradient. In a non-limiting example, the transparent conductive layers may be patterned into a spiral shape or a sinuous shape with each having an electrode connection at one end of the shape.

In some embodiments, the transparent conductive layers may each have an individually addressable second electrode connection, e.g., on an opposite end of the transparent conductive layer relative to the first electrode connection, that may be activated to modify the gradient or even eliminate it in the event that a uniform optical response characteristic is desired.

Driving Signal

The specific driving signal used to achieve a particular gradient is highly dependent upon many factors including, but not limited to, the LC materials, the cell gap, the transparent conductive layer resistivity, the size of the device, and the geometry of the electrode connections, to name a few. Thus, there is a wide range of voltages, frequencies, durations, and waveforms that may be useful, depending upon the device. Typically, the charging of the capacitor is characterized by the RC constant of the system. In this approach, the full charging is achieved if the driving signal duration is a few times longer than the RC constant. However, in this model, it is assumed that the capacitor is equally charged everywhere because the conductor is typically made from a low resistivity material such as copper, aluminum, gold etc. In a liquid crystal cell, however, the conductor has a discernible resistivity. This leads to a voltage drop across the ITO in a liquid crystal cell that reduces the voltage seen by the LC. If the connections are in the same vicinity, this voltage drop occurs as a function away from the connection area. If, in addition, the applied waveform is oscillatory in nature, the profile of the voltage away from the connection area will be frequency dependent. Therefore, by applying a sufficiently high frequency waveform, the penetration of the max voltage of the waveform away from the connection can be controlled. If the original amplitude of the waveform is above the Vth, a transition in the LC can be achieved. Below we present one non-limiting example of how the above parameters can be used to achieve the gradient effect.

Example 1

A curtaining, variable transmission, cell was prepared according to the following protocol. A test cell was fabricated using substrates of 0.7 mm thick ITO coated glass. On top of the ITO, a coating of polyimide, Nissan SE1211 (Nissan Chemical Industries, Ltd., Tokyo, Japan), was applied by spin coating and then baked at 100° C. for 2 hours. This polyimide coating served as an alignment layer designed to induce a substantially homeotropic surface alignment of the liquid crystal molecules. Next, Shinshikyu EW plastic spheres, 6 micron in diameter, (Hiko Industrial Ltd, Hong Kong) were sprayed onto one of the substrates to act as spacers. A thin bead of UV curable adhesive, Loctite 3106, (Henkel AG & Co. KGaA, Dusseldorf, Germany) was then applied around the perimeter of one of the substrates, leaving a gap that would serve as a fill port. The two substrates were then assembled, pressed together against the spacers to create a uniform gap between the substrates, and then exposed to UV light to cure the adhesive.

A guest-host mixture was then prepared that consisted of: (1) 94.8% by weight of negative dielectric anisotropy liquid crystal host, MLC-6609, from Merck (EMD Chemicals, Gibbstown, NJ, U.S.A.); which has a negative dielectric anisotropy ($\Delta\epsilon<0$); (2) 1.125% chiral dopant, ZLI811, also from Merck; and (3) a azo based dichroic dye mixture consisting of 0.41% of dye DR-1303; (AlphaMicron, USA), 0.95% of G-241; (Marubeni Chemicals, Japan), and 2.71% total of dyes LSY-210; (Mitsubishi Chemical Corporation, Japan), DD-1123, DD1032, DD1089; (AlphaMicron Inc, USA) mixed in equal ratios. The test cell was placed in a vacuum chamber to remove air in the gap between the substrates and then filled with the guest-host mixture by capillary action. The fill port was sealed using the UV curable adhesive. A conductive tape, consisting of a copper backing and conducting adhesive, was then adhered to the conducting polymer coating on edge of the assembled cell to serve as robust interconnects for electrical leads. A square wave waveform with a RMS voltage of 8V was applied at different frequencies ranging from 1 KHz to 60 Hz. A gradient tinting was observed as a function of the applied frequency. FIG. 16 shows the pictures of a cell that exhibits the performance.

Applications

The LC cells described herein have a wide variety of potential uses. For example, these devices may be directly fabricated into or laminated onto "wearable" products such as eyewear (such as prescription and non-prescription glasses and sunglasses), visors, goggles, face shields, near-eye displays, and AR/VR headsets to name a few. Alternatively, they may be directly fabricated into or laminated onto other products including, but not limited to, windows (vehicles, buildings, aircrafts, etc.), windshields, sunroofs, heads-up displays, and optical instruments. Such products and devices may be further equipped with power supplies, batteries, sensors or the like.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention.

The invention claimed is:

1. An optical device with one or more spatially variable optical response characteristics, the optical device comprising one or more individual liquid crystal cells, wherein each individual cell comprises:
   a liquid crystal material contained between a single pair of substrates, each substrate having a transparent conductive layer provided thereon;
   an electrode connection contacting each transparent conductive layer; and
   a driving signal source in electrical communication with each electrode connection for application of a driving signal to the cell,
   wherein:
   i) an applied driving signal to the electrode connections from the driving signal source creates a voltage gradient in a gradient direction along the pair of transparent conductive layers leading away from the electrode connections; and
   ii) the voltage gradient is received by the liquid crystal material to produce a gradient effect in at least one optical response characteristic across at least a portion of the device.

2. The optical device of claim 1, wherein the one or more optical response characteristics includes reflection, refraction, absorption, or scattering, or a combination thereof.

3. The optical device of claim 1, wherein the liquid crystal material comprises a guest-host mixture and at least one optical response characteristic is absorption.

4. The optical device of claim 1, wherein the transparent conductive layers are not pixelated.

5. The optical device of claim 1, wherein the electrode connections are each located at about the same position within the device.

6. The optical device of claim 1, wherein the electrode connections are each co-located at or near a device edge, at or near a device corner, or at or near a device center.

7. The optical device of claim 1, wherein the driving signal is characterized at least by a voltage and a frequency.

8. The optical device of claim 7, wherein altering the frequency of the driving signal varies at least one optical response characteristic along the gradient direction.

9. The optical device of claim 7, wherein the voltage is greater than Vth of the LC and the frequency is greater than 30 Hz.

10. The optical device of claim 1, wherein the liquid crystal material has a negative anisotropy.

11. The optical device of claim 1, wherein the liquid crystal material has a positive anisotropy.

12. The optical device of claim 1, wherein each electrode connection is an electrode bus along a border or edge of the cell.

13. The optical device of claim 12, wherein the border is circular and the gradient direction is the radius of the circle, such that at least one optical response characteristic of the cell is variable along the radius of the circle.

14. The optical device of claim 1, wherein the optical device is a spatially variable light filter.

15. The optical device of claim 1, wherein the transparent conductive layer is a uniform layer without any patterns.

16. The optical device of claim 1, wherein the transparent conductive layer has a resistivity of greater than or equal to 1 ohm/square.

17. The optical device of claim 1, wherein the at least one optical response characteristic is refraction.

18. The optical device of claim 17, wherein the device is a lens with variable refractive index.

19. The optical device of claim 17, wherein the device is a variable beam deflector.

20. An article of manufacture comprising an optical device of claim 1, wherein the article of manufacture includes eyewear, a visor, goggles, a face shield, an AR/VR headset, a near-eye display, a window, a windshield, a sunroof, a heads-up display or an optical instrument.

21. The article of manufacture of claim 20, wherein the optical device is laminated thereto.

22. The optical device of claim 1, wherein the gradient effect is in an optical response gradient direction that starts with a first end near the electrode connection and finishes with a second end away from the electrode connection.

* * * * *